US006567655B1

(12) United States Patent
Wietzke et al.

(10) Patent No.: US 6,567,655 B1
(45) Date of Patent: May 20, 2003

(54) CAR RADIO SYSTEM

(75) Inventors: Joachim Wietzke, Karlsruhe (DE); Karl-Heinz Cording, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,220

(22) PCT Filed: Mar. 28, 1998

(86) PCT No.: PCT/DE98/00901

§ 371 (c)(1), (2), (4) Date: Jun. 22, 2000

(87) PCT Pub. No.: WO99/16286

PCT Pub. Date: Apr. 1, 1999

(30) Foreign Application Priority Data

Sep. 24, 1997 (DE) ........................................ 197 42 087

(51) Int. Cl.[7] .................................................. H04B 1/06

(52) U.S. Cl. ......................... 455/345; 455/90; 455/350; 455/569; 381/74; 381/86

(58) Field of Search ................................ 455/344, 345, 455/347, 350, 568, 569, 90; 381/74, 86, 370, 374, 376, 381, 384, 371

(56) References Cited

U.S. PATENT DOCUMENTS 3,829,624 A * 8/1974 Goodin et al. .............. 381/371
4,324,951 A * 4/1982 Brown ........................ 381/86
4,706,273 A * 11/1987 Spear et al. ................ 455/569
5,661,811 A 8/1997 Huemann et al. ............. 381/86
6,330,337 B1 * 12/2001 Nicholson et al. ............ 381/86

FOREIGN PATENT DOCUMENTS

| | | |
|---|---|---|
| EP | 0 069 213 | 1/1983 |
| JP | 61 102827 | 5/1986 |
| JP | 01 072607 | 3/1989 |

OTHER PUBLICATIONS

Lafayette Radio Electronics Catalog 670, 1967, p. 237.*

Patent Abstracts of Japan, vol. 13, No. 292 (E–782) (Jul. 6, 1989), pp. 1–4.*

Patent Abstracts of Japan, vol. 10, No. 283 (E–440) (Sep. 26, 1986), pp. 1–3.*

* cited by examiner

*Primary Examiner*—Quochien Vuong
(74) *Attorney, Agent, or Firm*—Kenyon & Kenyon

(57) ABSTRACT

A car radio system includes a car radio and at least two speakers connected to the car radio. The system can be used by only some of the vehicle occupants without disturbing the other occupants by providing at least one of the speakers with a jack for connecting a headset plug and with a switch that can be used to deactivate playback via the speakers.

4 Claims, 5 Drawing Sheets

CAR RADIO SYSTEM

FIELD OF THE INVENTION

The present invention relates to a car radio system with a car radio and at least two speakers connected to the car radio.

BACKGROUND OF THE INVENTION

The use of a car radio system sometimes raises problems when several different car occupants have divergent listening preferences and needs and are unable to reach a compromise. According to experience, this commonly happens when children who want to listen to a children's audio book tape or a radio program aimed specifically at children are also traveling in the car on extended journeys. Even if, in such instances, the adult travelers are willing to set aside their own listening preferences in radio broadcasts, music tapes, or music CDs, they often feel burdened by children's programs that do not interest them in the least. This burden is not relieved even with a car radio system having front speakers and rear speakers after cross-fading to the rear speakers, allowing the program to be heard primarily by the children sitting in the rear seats. The residual interference produced by the rear speakers is felt to be unpleasant.

One alternative is to simply provide the children with a portable tape recorder and a headset, which, however, prevents them from receiving radio broadcasts, since a portable device cannot receive such broadcasts in adequate quality within a motor vehicle. In addition, many parents do not want to purchase a portable tape recorder for children, especially not just for trips in the car. In this case, all car occupants must necessarily listen to the same program over the speakers of the car radio system.

SUMMARY OF THE INVENTION

The object of the present invention is to improve the situation of people traveling together who have divergent listening preferences.

This object is achieved according to the present invention by a car radio system in which at least one of the speakers is provided with a jack for connecting a headset plug and with a switch that can be used to deactivate playback via the speakers.

According to the present invention, the object mentioned above is achieved with the use of a headset, i.e., earphones, which can be connected by a plug to a jack of a speaker. This makes it possible to connect the headset over short distances even in the rear seat of a motor vehicle because speakers are commonly provided in the rear seat area of the motor vehicle. A method for connecting a headset to a device is known from home stereo equipment and televisions. According to the present invention, connecting the headset to the control unit of the system, in this case a car radio, is avoided because this would make it impractical to route the cable to a person wearing a headset and sitting in the back seat.

According to the present invention, the headset can thus be contacted to the speaker over a short distance for a passenger sitting in the back seat, at the same time turning off the speaker.

In one preferred embodiment, the jack is designed as a switching socket with an integrated changeover switch so that inserting a headset plug automatically turns off the speaker.

In ordinary car radio systems, speakers are provided in pairs to provide playback in stereo. Connecting a headset to only one speaker and only to its playback channel can therefore be useful only if the car radio unit is simultaneously switched to mono playback mode.

However, stereo playback via the headset is preferred. For this purpose, a particularly preferred embodiment of the present invention provides a connection between two speakers forming a speaker pair and provided to receive different stereo channels to play both stereo channels via the headset. A connection is preferably provided between the two speakers, and the switch for deactivating the speaker is inserted into the signal lines for both speakers.

Another preferred feature is that a volume control is provided on the speaker provided with a jack which can be used to control the playback volume of the headset. This makes it possible for the person wearing the headset to adjust the desired volume individually, avoiding the need to adjust the volume on the car radio itself.

According to the present invention, it is also possible for both speakers in a speaker pair each to be equipped with a jack for a headset for both channels of the speakers.

According to a basic version, both speakers in a speaker pair can each be provided with a jack for a headset connection for the corresponding channel of the speaker. In this case, stereo playback via one headset is possible only if the headset is provided with two plugs for the two earphones, and the plugs are inserted into both speaker jacks.

DETAILED DESCRIPTION

Figure 1:
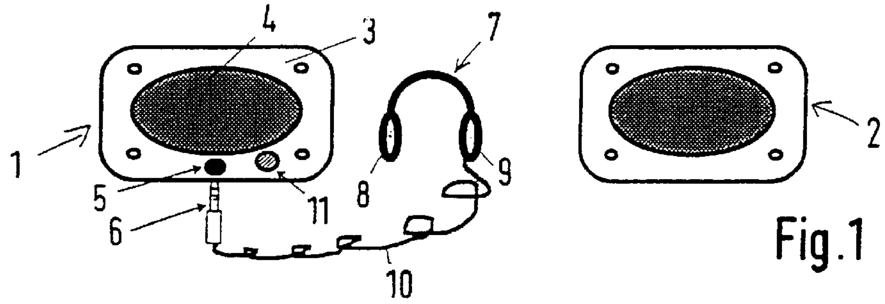
FIG. 1 shows a speaker pair having one speaker equipped with a jack for a headset.

FIG. 1 shows two speakers 1, 2 in a speaker pair which are built into a car radio system for playing two different stereo channels in the motor vehicle and are located near the rear seats. Speakers 1, 2 each have a speaker console 3 and a screen 4 covering a speaker membrane.

One speaker 1 of speaker pair 1, 2 is provided with a jack 5 into which a headset plug 6 of a headset 7 with two earphones 8, 9 can be inserted, with headset plug 6 being connected to headset 7 by a flexible connecting cable 10.

Speaker 1 is additionally provided with a control 11 for adjusting the playback volume of headset 7.

The arrangement shown in FIG. 1 is provided for playing stereo broadcasts via headset 7. Because each of speakers 1, 2 is configured to play only one of the two stereo channels, a connection must be provided between speakers 1, 2 so that the audio signal for speaker 2 can also reach headset 7.

Figure 2:
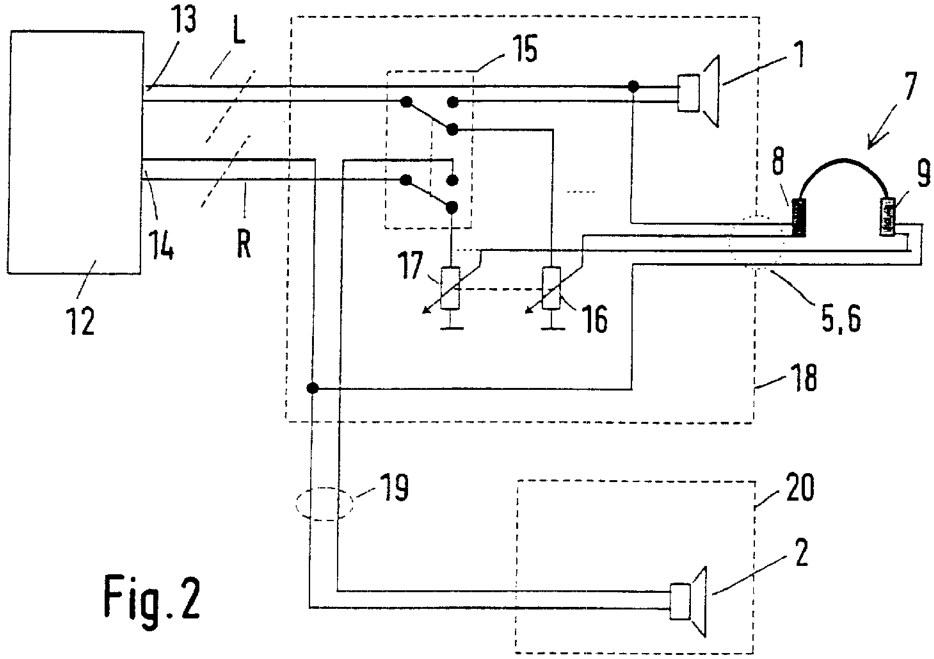
FIG. 2 shows a first embodiment of a circuit arrangement of the speakers according to FIG. 1.

FIG. 2 shows a method for connecting the arrangement according to FIG. 1. A car radio 12 has two outputs 13, 14 for two stereo channels L and R. Both stereo channels L, R are provided in the usual manner with two-wire lines. In the embodiment illustrated, the two wires of stereo channel L lead to the two corresponding ports in speaker 1, and the two wires of stereo channel R lead to the two ports in speaker 2. This normal connection to speakers 1, 2 is established when a switch 15 designed as a changeover switch is located in the switch position not shown in FIG. 2.

When changeover switch 15 is in the switch position shown in FIG. 2, one wire of each stereo channel L, R is interrupted by switch 15, deactivating speakers 1, 2. A branch extends from the line of stereo channel L not interrupted by switch 15 to the magnetic system of earphone 8 in headset 7. The return line passes via a center tap of a potentiometer 16, whose base point is connected to ground and whose other port is connected to the closed contacts of switch 15, thus forming a link with the second line of stereo channel L. This circuit supplies power to earphone 8 of headset 7 through stereo channel L, making it possible to adjust the volume using potentiometer 16 connected to control 11. Similarly, earphone 9 is wired to other stereo channel R, with a potentiometer 17 that can be adjusted by control 11 simultaneously with potentiometer 16 being inserted into the return line, making it possible to adjust the volume of both stereo channels L, R for headset 7 simultaneously using control 11.

According to the circuit variation illustrated in FIG. 2, the lines for both stereo channels L, R are first routed to housing 18 (indicated by the dotted lines) of speaker 1, and a connecting cable 19 runs from housing 18 of speaker 1 to housing 20 of speaker 2. The branches to earphones 8, 9 of headset 7 are also located in housing 18 of speaker 1, as are all contacts of switch 15.

When laying the cables to both speakers 1, 2, this means that both cables for both stereo channels L, R are first routed from car radio 12 to housing 18 of speaker 1, and that connecting cable 19 connecting housing 18 of speaker 1 to housing 20 of speaker 2 must be laid on the other side of the vehicle interior.

Figure 3:
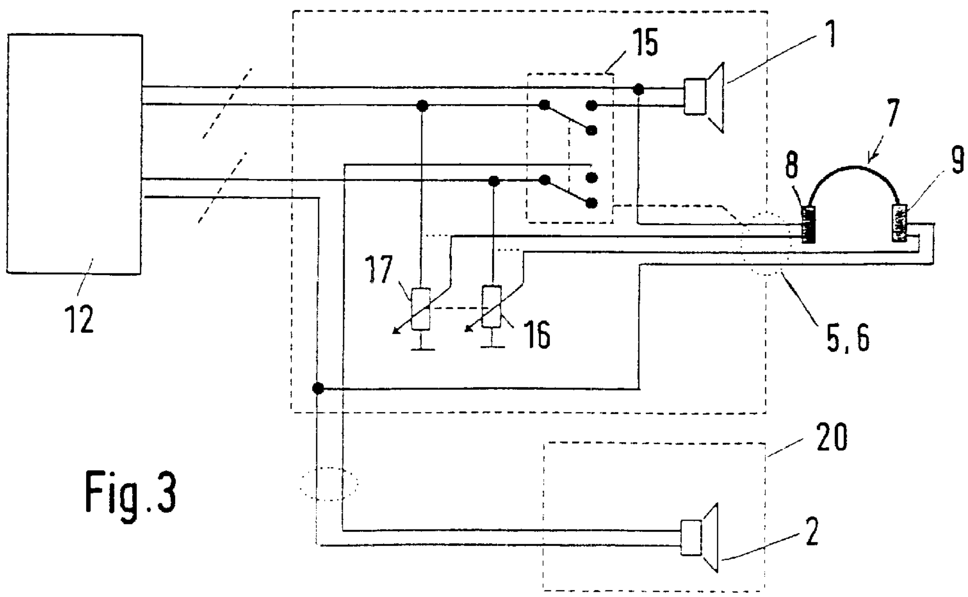
FIG. 3 shows a second embodiment of a circuit arrangement of the speakers according to FIG. 1.

The circuit variation illustrated in FIG. 3 differs only in the method for contacting potentiometers 16, 17, which are not positioned between headset 7 and switch 15—as in FIG. 2—but are now located between switch 15 and car radio 12 so that switch 15 functions only as an on-off switch for speakers 1, 2. Consequently, the lines leading to jack 5 are not interrupted by switch 15.

In this circuit variation, potentiometers 16, 17 also influence the playback volume of speakers 1,2.

Figure 4:
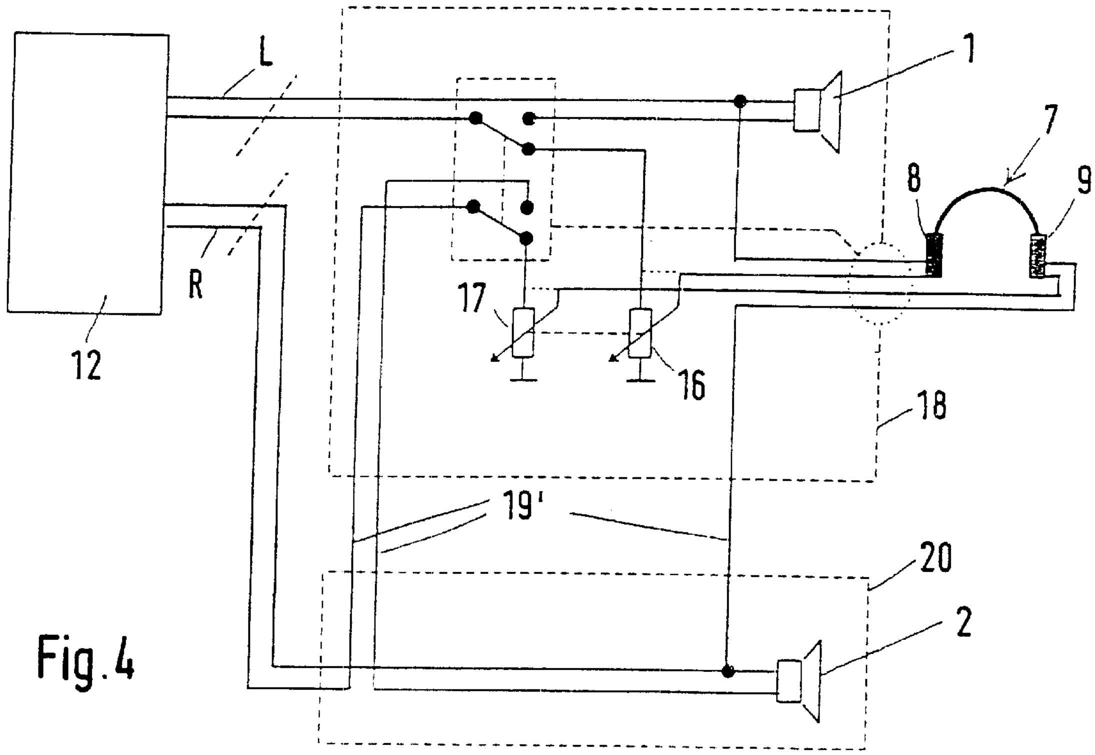
FIG. 4 shows a circuit variation for routing the line from the car radio to both speakers.

In the embodiment illustrated in FIG. 4, a line for one stereo channel L is routed to housing 18 of speaker 1, and a line for other stereo channel R is routed to housing 20 of speaker 2, so that the lines are routed to speakers 1, 2 in the usual manner on both sides of the automobile. Inside housing 20 of speaker 2, a line for stereo channel R is interrupted and routed by two wires of connecting cable 19' to two contacts provided in switch 15 for switching speaker 2. Likewise, switch 15 switches speaker 2 on and off. When switch 15 is in the position shown in FIG. 4, speaker 2 is switched off, thus deactivating one wire of connecting cable 19', while the other wire is connected to potentiometer 17. The center tap of potentiometer 17 is connected to the return line of earphone 9, the other end of which is connected via a third wire of connecting cable 19' to the other wire of stereo channel R routed to housing 20 of speaker 2. Potentiometers 16, 17 are switched as shown in FIG. 2 and therefore are used only to control the playback volume of headset 7.

Figure 5:
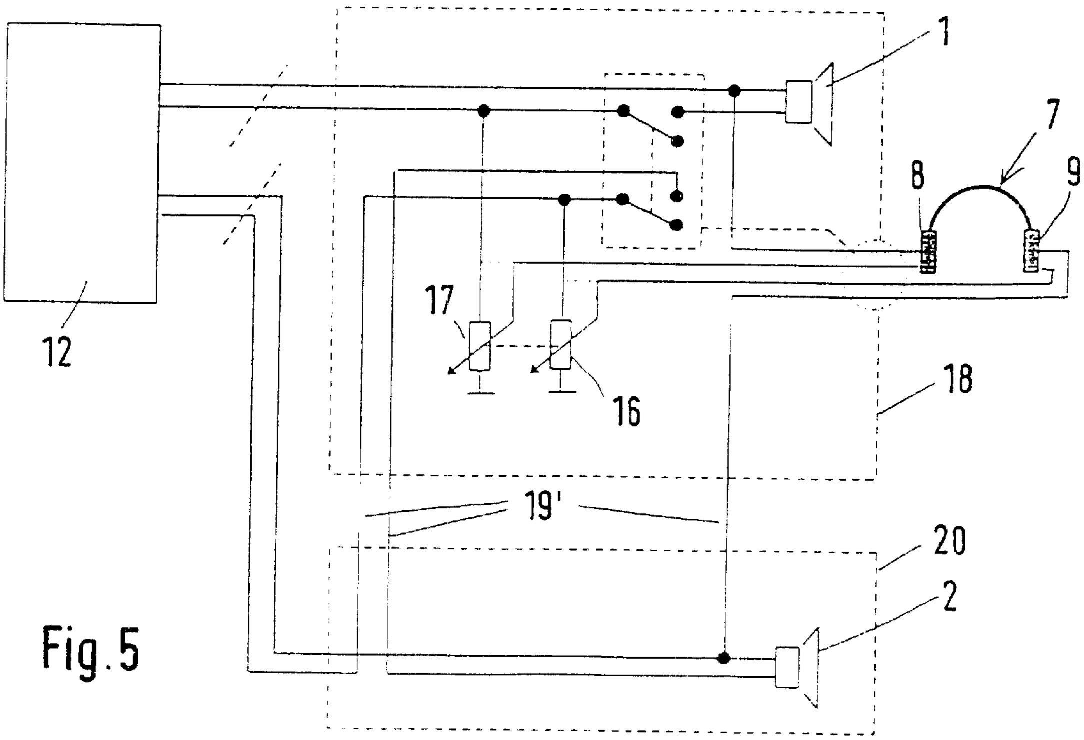
FIG. 5 shows a further circuit variation for the arrangement according to FIG. 1 with the line routed from the car radio to both speakers, as shown in FIG. 3.

FIG. 5 shows an embodiment of the circuit and wiring according to FIG. 4, i.e., providing a three-wire connecting cable 19' between housings 18 and 20 in which, however, potentiometers 16, 17 are connected as shown in FIG. 3 so that potentiometers 16, 17 are also used to adjust the volume of speakers 1, 2.

Figure 6:
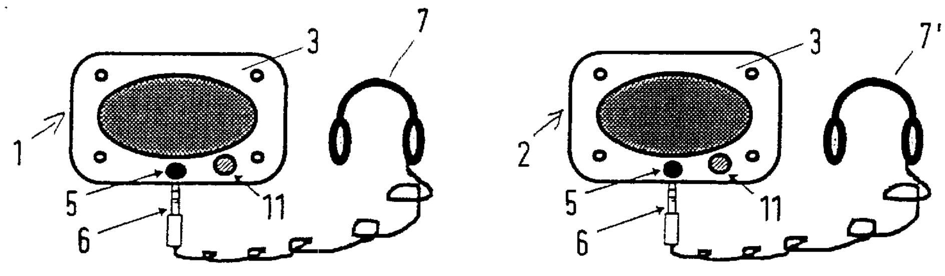
FIG. 6 shows a schematic representation of a speaker pair with the ability to connect a headset to both speakers in a speaker pair.

FIG. 6 shows an embodiment of the present invention in which both speakers 1, 2 are equipped with jacks 5 for headset plugs 6, and each has a control 11. In this variation, both headsets 7, 7' at speakers 1, 2 should be able to receive stereo broadcasts.

Figure 7:
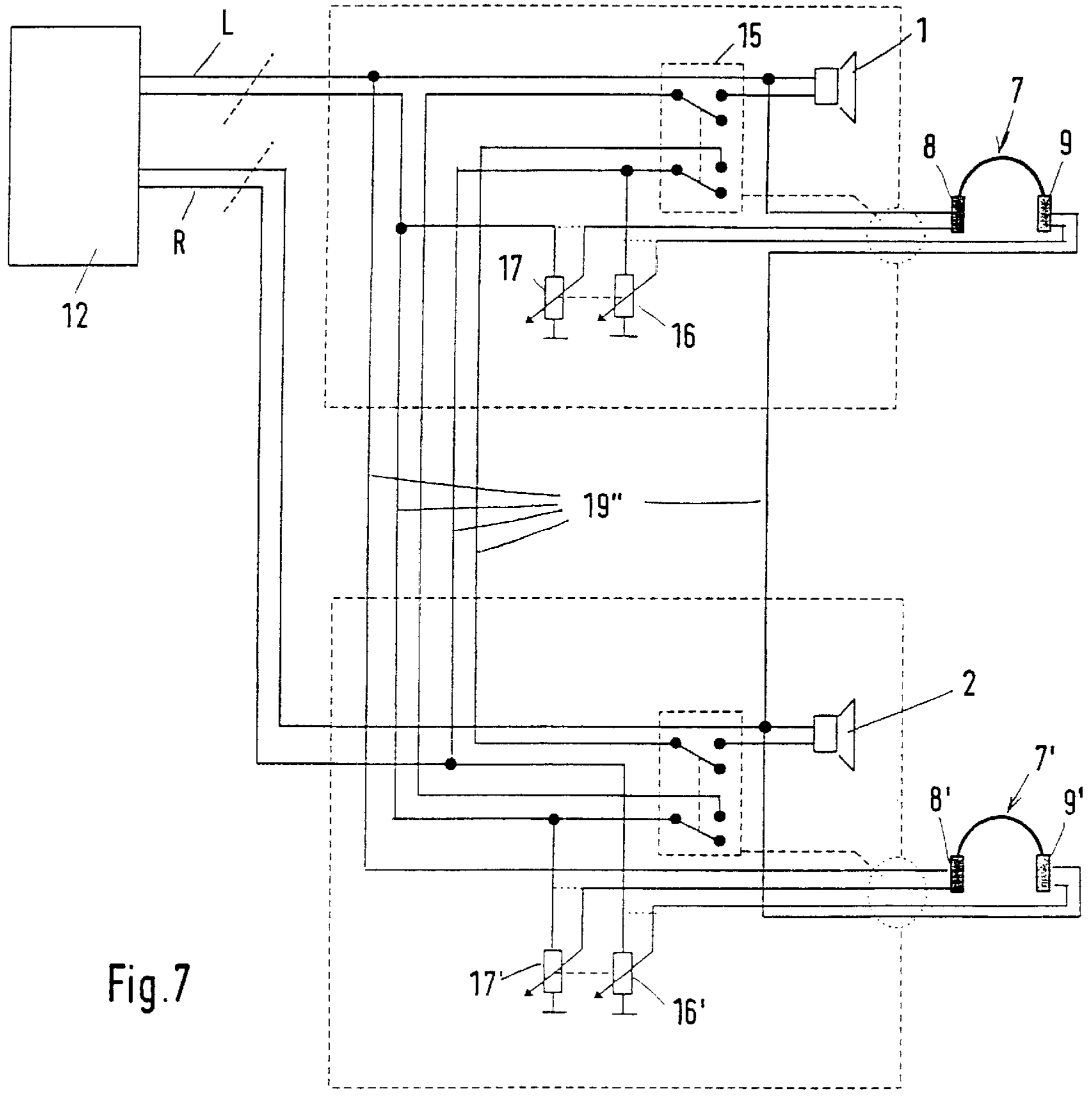
FIG. 7 shows an embodiment for connecting the speaker arrangement according to FIG. 6.

FIG. 7 shows an embodiment of a corresponding circuit arrangement. In this circuit variation, stereo channels L, R are routed to corresponding housings 18, 20 of speakers 1, 2 separately. Both housings 18, 20 contain switches 15, 15', each of which includes three contacts for speaker 1 and three contacts for speaker 2. Switches 15, 15' are connected in series in relation to both stereo channels L, R, so that actuating one of switches 15, 15' mutes both speakers 1, 2.

The return lines of earphones 8, 9 and 8', 9', respectively, which are connected to a non-switched wire of stereo channel L, R, are routed directly to the corresponding return line of stereo channel L and R, respectively, via corresponding potentiometer 16, 17 and 16', 17', respectively. As in the embodiments illustrated in FIGS. 3 and 5, switches 15, 15' in the circuit variation according to FIG. 7 are designed as on-off switches for speakers 1, 2.

In all circuit variations illustrated in FIGS. 2 through 5 and 7, potentiometers 16, 17 and 16', 17', respectively, can be dispensed with if a separate volume control is not required. The dotted bridging lines above potentiometers 16, 17, 16', 17' indicate the circuit embodiment that results when potentiometers 16, 17, 16', 17' are omitted.

FIG. 7 shows that connecting cable 19" provided between housings 18, 20 is designed with five wires in this case.

Figure 8:
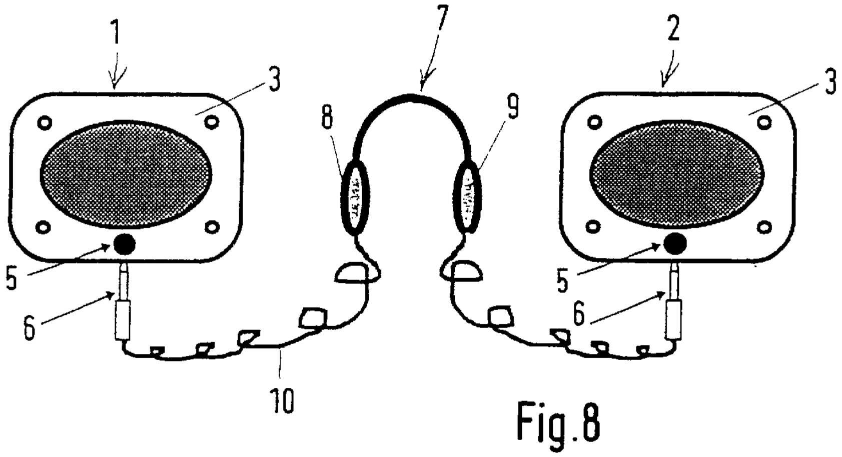
FIG. 8 shows a speaker pair with jacks for connecting headset plugs to only the corresponding speaker channel.

FIG. 8 shows a basic embodiment of the present invention. Speakers 1, 2 in this version both have jacks 5 via which, however, only the corresponding channel of speaker 1, 2 can be tapped so that both earphones 8, 9 are routed by flexible cables 10 to corresponding speaker 1, 2, where the signal for correct stereo channel L, R is tapped. Speaker consoles 3 in this case are not provided with controls 11.

Figure 9:
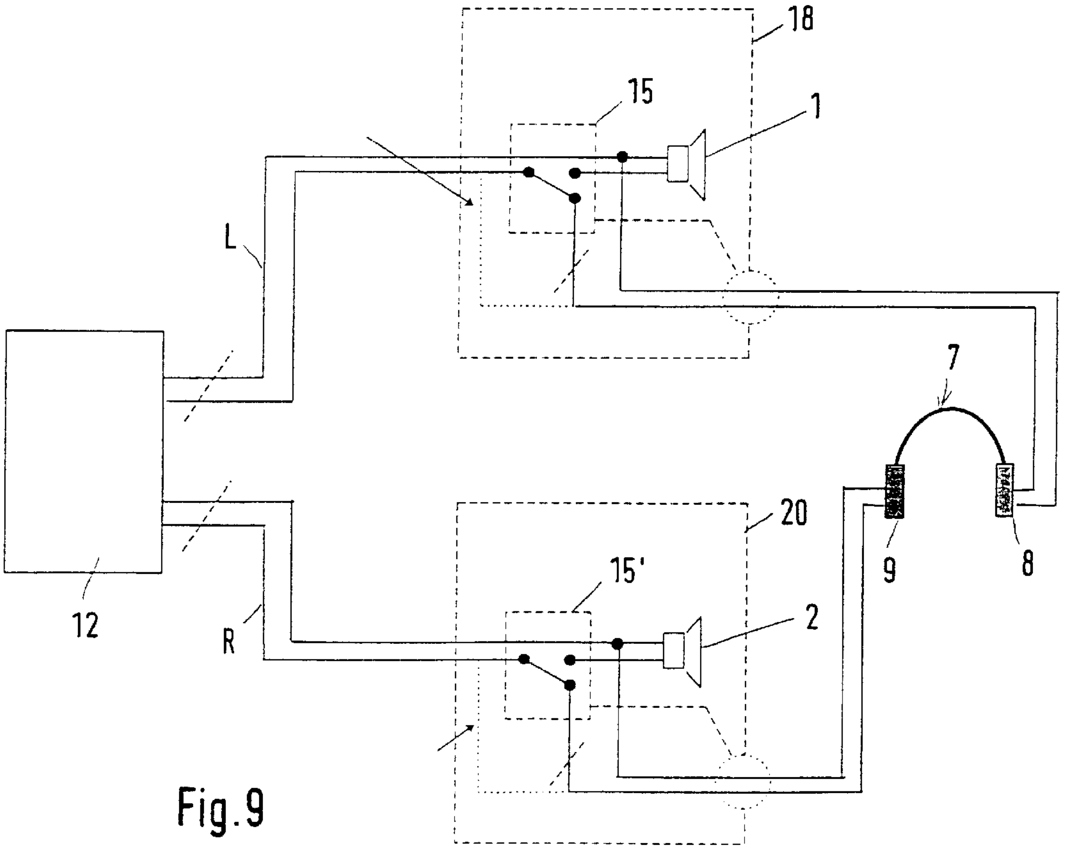
FIG. 9 shows an embodiment for connecting the arrangement according to FIG. 8.

FIG. 9 shows a method for connecting the arrangement shown in FIG. 8. Both stereo channels L, R are routed in the usual manner from car radio 12 to housings 18, 20 of speakers 1, 2. Each housing contains a switch 15, 15' that, however, is equipped in this embodiment with only three contacts for corresponding stereo channel L, R for speaker 1, 2 to which it is assigned. The solid lines show the wiring of switches 15, 15' as changeover switches. Alternatively, switches 15, 15' can be wired as on-off switches for speakers 1, 2, as shown by the dotted lines. When switches 15, 15' are in the switch position that turns speakers 1, 2 off, a connection closing the control circuit and routed to earphone 8 is established via the control lines of stereo channel L for speaker 1, while this connection is established to earphone 9 via the control lines for stereo channel R of speaker 2. There is no need in this case for a connecting cable between speaker housings 18, 20.

In a further variation (not illustrated), both speakers 1, 2 can be supplied with mono signals via channels L, R, making it possible and useful to connect mono headsets or earphones to both speakers 1, 2. For this variation, however, it may be expedient to provide separate on-off switches for speakers 1, 2 on consoles 3 of speakers 1, 2, so that, when only one headset 7 is connected to speaker 1, other speaker 2 can still be turned off without having a connected headset 7 of its own.

Of course, wireless headset systems can also be used to implement the present invention if the necessary power supply is provided for the receiver connected to speakers 1, 2. This can be achieved by providing a battery-operated receiver or by laying a power supply cable to the headset jack of speaker 1, 2.

Figure 10:
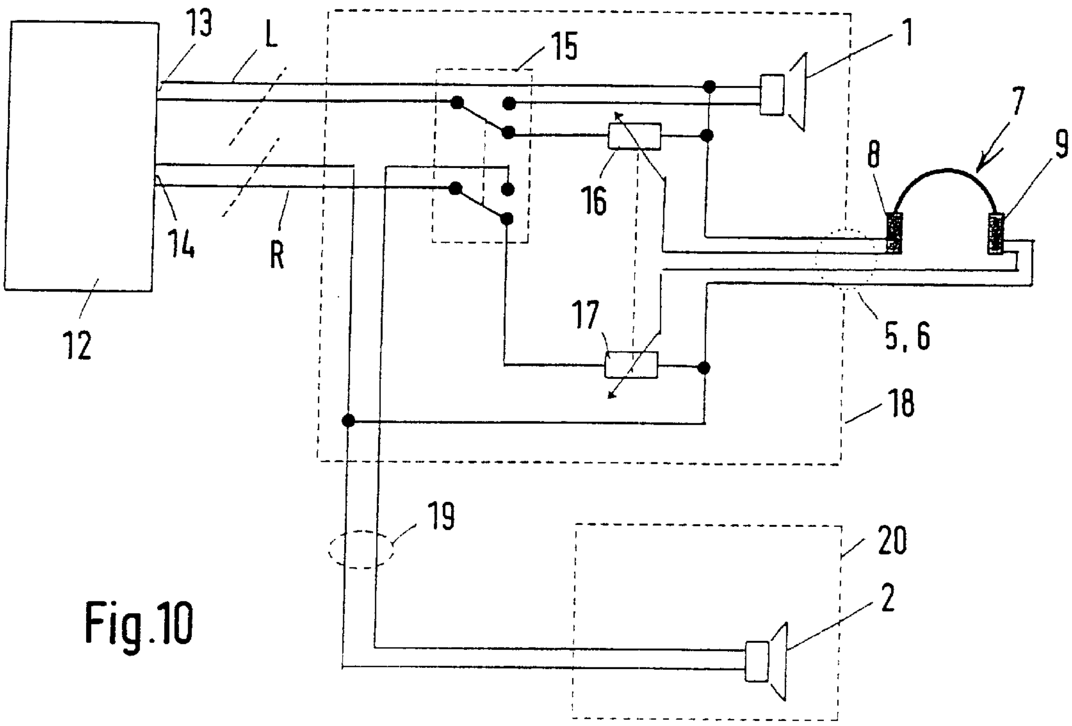
FIG. 10 shows a modification of the first embodiment for connecting the speakers according to FIG. 2.
Figure 11:
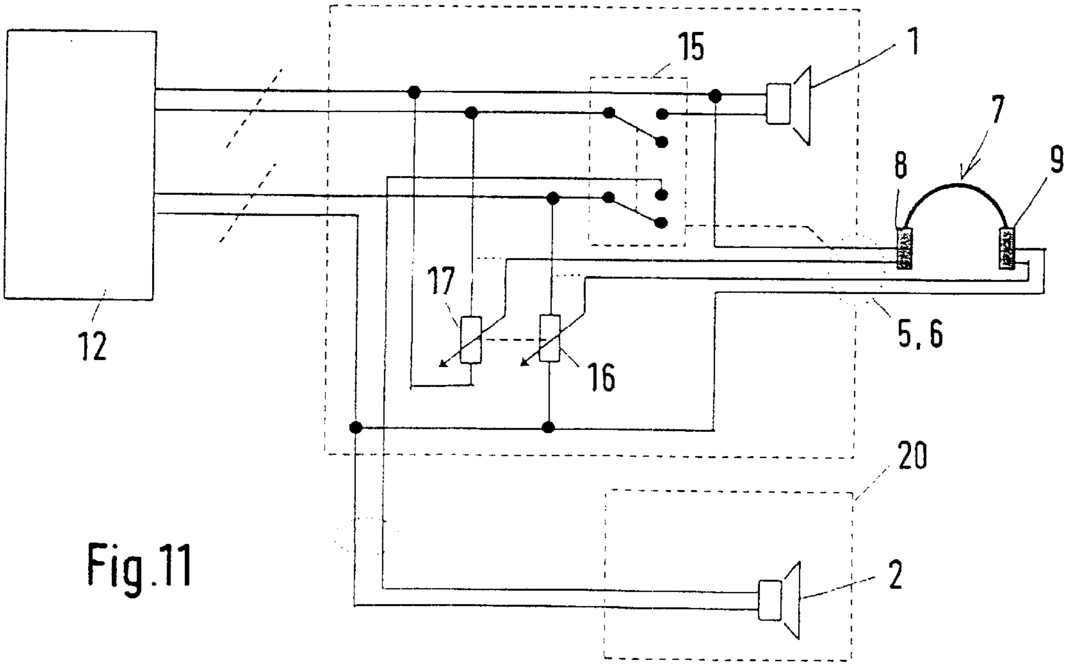
FIG. 11 shows a modification of the second embodiment for connecting the speakers according to FIG. 34

In the circuit embodiments shown up to this point, the illustrated base points of potentiometers 16, 17 and 16', 17', respectively, are connected to ground. This is possible when one of the signal lines of speakers 1, 2 is routed to ground. Because this is not necessarily the case, FIGS. 10 and 11 show the embodiments according to FIGS. 2 and 3, with the return line from the base point of potentiometers 16, 17 being illustrated as though it were connected to the other jack of speaker 1, 2 without indicating a connection to ground.

Corresponding modifications can also be made for the other embodiments shown in FIGS. 4 through 9.

The illustrated embodiments show that numerous variations are possible within the scope of the present invention, with the embodiment preferred in each instance being suitably determined by the individual circumstances that apply when laying the cables and the ability to provide a suitable connection 19, 19', 19" between housings 18, 20 of both speakers 1, 2.

What is claimed is:

1. A car radio system, comprising:

a car radio; and at least two speakers connected to the car radio, at least one of the at least two speakers including a jack for connecting a headset and including a switch for deactivating a playback procedure via the at least two speakers;

wherein one of the speakers includes a volume control provided by the jack, the volume control simultaneously controlling a playback volume of the speakers and the headset.

2. The car radio system according to claim 1, wherein the jack is designed as a switching socket including the switch.

3. The car radio system according to claim 1, further comprising:

a connecting arrangement coupling the speakers to form a speaker pair, the connecting arrangement receiving different stereo channels, wherein the switch is situated in signal lines for the speakers.

4. The car radio system according to claim 1, wherein the volume control includes two adjusting elements for each of the speakers in the speaker pair.

* * * * *